Patented Apr. 16, 1940

2,197,498

UNITED STATES PATENT OFFICE 2,197,498

STABILIZED SOLUTIONS OF METAL ORGANIC COMPOUNDS AND METHOD OF MAKING THE SAME

Walter S. Guthmann, Chicago, Ill., assignor to Leo Corporation, Chicago, Ill., a corporation of Illinois No Drawing. Application May 7, 1937, Serial No. 141,256

14 Claims. (Cl. 44—9)

This invention relates to stabilized solutions of metal organic compounds and to a method of making the same. More particularly, the invention relates to the stabilization of motor fuels comprising liquid hydrocarbons containing dissolved metal organic compounds, by the addition thereto of an oil soluble acid or compound capable of forming a metal salt or metal complex that is relatively oil or water soluble, or by the addition thereto of a water soluble acid or acid reacting substance in conjunction with such oil soluble acid or compound.

Metal organic compounds, such for instance as the heavy metal compounds of the beta diketones, are susceptible to hydration or hydrolysis when water is present. When such heavy metal salts of beta diketones are dissolved in benzene, as in the preparation of a composition for addition to motor fuels to prevent "knock", it has been observed that there is a tendency upon standing for a precipitate to form, probably either a basic salt of the heavy metal or a hydrate of the original metal compound. Similarly, hydration or hydrolysis occurs after the composition containing the heavy metal beta diketone compound has been added to the motor fuel, since minor proportions of water are almost invariably associated with the liquid hydrocarbons used as fuels in internal combustion engines. Water, for example, finds its way into receptacles containing motor fuels by virtue of the breathing action that takes place, the moisture introduced with the air into the receptacle being condensed quite largely around the walls and accumulating at the bottom of the receptacle. Also, due to the very slight solubility of water in liquid hydrocarbons, such as gasoline, a very minor proportion of water may be dispersed in the body of the liquid hydrocarbon mixture.

I have now found that the tendency of metal organic compounds to become hydrated or hydrolyzed, due to the presence of water in association with the liquid hydrocarbons in which such compounds are dissolved, may be inhibited by the addition of an organic acid that is itself soluble in the liquid hydrocarbon, or by the addition of a compound capable of forming a complex compound with the metal present which is also oil or water soluble.

In its simplest and most readily understandable embodiment, this invention comprises the addition of an organic beta diketone to a solution of a heavy metal beta diketonate in a liquid hydrocarbon. If, in such case, the heavy metal beta diketone compound tends to form a basic salt in the presence of water, which would precipitate out, then the added beta diketone has the effect of driving the reaction in the other direction, thereby tending to retard the formation of the insoluble basic salt or to keep such salt in solution in the liquid hydrocarbon. Similarly, if the tendency of the heavy metal beta diketone compound is to form an oil insoluble hydrate in the presence of water, the addition of the beta diketone to the solution containing the heavy metal salt of a beta diketone is effective in keeping the latter in solution by depressing its tendency to form the less soluble hydrate.

Instead of adding beta diketone to stabilize a solution of a heavy metal beta diketonate in a liquid hydrocarbon, any oil soluble organic acid may be added that forms an oil or water soluble salt of the heavy metal present. While the theory is not so clearly understandable, the principle is nevertheless similar to that explained above. For instance, if a naphthenic acid is substituted for the added diketone in the embodiment of the invention given above, the heavy metal beta diketone salt will tend to remain in solution owing to the preferential formation of a naphthenate of the heavy metal which is soluble in the liquid hydrocarbon rather than the formation of an insoluble hydrate or basic salt of the metal. Since the effect of an oil soluble metal salt upon keeping the heavy metal beta diketonate in solution is much greater than the effect of the hydrogen ions produced by the acid in water solution, the strength of the organic acid used to form a metal salt is not of great consequence.

My invention also contemplates the use of a water soluble acid or acid reacting substance not soluble in liquid hydrocarbons, in conjunction with an oil soluble organic acid or compound such as above described. The addition of a water soluble acid or acid reacting substance for effecting the stabilization of heavy metal organic compounds in liquid hydrocarbons is described and claimed in the copending application of Willard E. Lyons, Serial No. 141,255, filed May 7, 1937, so that the use here of such acids or acid reacting substances is claimed only in conjunction with the use also of oil soluble compounds for increasing the solubility of heavy metal organic compounds in liquid hydrocarbons.

The stabilizing effect of an added water soluble acid or acid reacting substance to a solution of a heavy metal organic compound in a liquid hydrocarbon is believed due to the formation of a sufficient hydrogen ion concentration in the water phase present to prevent or retard the conversion of the heavy metal organic compound into an insoluble basic salt. For instance, the addition of boric acid, which forms a water soluble borate of the heavy metal present, increases the hydrogen ion concentration in the water phase to an extent sufficient to inhibit the formation of a basic salt of the metal. By the combined use of an oil soluble organic compound and a water soluble acid or acid reacting substance, an improved stabilizing effect is obtained that is not possible by the use of either treatment alone. The amount of the oil soluble compound that would be required if used alone is less where a water soluble acid or acid reacting substance is simultaneously used.

It is therefore an important object of this invention to provide a method of stabilizing solutions of heavy metal organic compounds in liquid hydrocarbons by the addition of an oil soluble acid or compound capable of forming a salt or complex of the metal that is relatively oil or water soluble.

It is a further important object of this invention to provide a method of stabilizing motor fuels having dissolved therein heavy metal organic compounds susceptible to hydrolysis or hydration in the presence of water.

It is a further important object of this invention to provide an improved method of stabilizing solutions of heavy metal organic compounds in liquid hydrocarbons by the combined action of oil soluble organic acids dissolved therein and of water soluble inorganic acids or acid reacting substances associated therewith for solution in any water that may be present.

It is a further important object of this invention to provide a stabilized solution of a heavy metal compound of a beta diketone in a liquid hydrocarbon, or mixture thereof, such as motor fuels and the like, wherein the stabilizing agent is an oil soluble organic acid or compound capable of forming oil or water soluble salts with the heavy metal.

It is a further important object of this invention to provide a stabilized solution of a heavy metal compound of a beta diketone in a liquid hydrocarbon, or mixture thereof, such as motor fuels and the like, wherein a combination of an oil soluble organic acid and a water soluble inorganic acid or acid reacting substance is used as the stabilizing agent.

Other and further important objects of this invention will become apparent from the following description and appended claims.

The liquid hydrocarbons to which my invention is particularly directed are those generally employed as motor fuels, such as gasoline, benzene, polymerized hydrocarbons, or blends thereof. Of the metal organic compounds which may be added to such hydrocarbons for increasing the efficiency of their combustion in internal combustion engines, the heavy metal compounds of the beta diketones have been found particularly useful. The metals intended to be included by the term "heavy metals" are those classified as such in the periodic table shown in Demings General Chemistry, fourth edition. These compounds, while forming relatively stable solutions in liquid hydrocarbons that are free from water, have a tendency to form insoluble precipitates when water is present, due probably to hydrolysis or hydration with the consequent formation of basic salts of the compound or bases of the metal.

In accordance with the method of this invention, an oil soluble compound capable of forming an oil or water soluble salt or complex of the heavy metal present, is added to the solution of the heavy metal organic compound in the liquid hydrocarbon, or mixture thereof. Various oil soluble compounds of this type may be used, such as organic beta diketones, naphthenic acids, ethyl aceto-acetate, oleic acid, and the like.

The amount of stabilizing agent, or inhibitor, to be added to any given mass of a liquid hydrocarbon, may be greatly varied, but, in general, from 10% and upwards of the stabilizing agent by weight of the amount of heavy metal organic compounds present will be found more satisfactory.

For example, if 100 parts by weight of a mixture of heavy metal beta diketonates, such as nickel, cobalt and cerium acetyl acetonates or propionyl acetonates, were dissolved in benzene, or in a polymer gas relatively rich in aromatic hydrocarbons, for use in the treatment of appropriate quantities of gasoline motor fuel, then approximately 10 to 25 parts by weight of a naphthenic acid, ethyl, aceto-acetate, propionyl acetone or acetyl acetone might be added to the benzene solution to stabilize the heavy metal beta diketones present. The addition of a larger proportion of the stabilizing agent or inhibitor would not result in a proportionately greater stabilizing effect, but within reasonable limits would be in no way harmful, except as the larger proportion would result in an added cost of manufacture.

Upon the addition to a motor fuel, such as gasoline, of the aromatic hydrocarbon solution of the metal beta diketonate referred to above in the proportion necessary to impart to the gasoline a content of metal beta diketonate sufficient to give the desired improvement in the combustion of the fuel, the added stabilizing agent, or inhibitor, continues to prevent or retard the precipitation out of solution of a basic salt or base of any of the heavy metals present. In the absence of the added stabilizing agent, there would be a tendency of insoluble precipitates to form in the treated fuel owing to the presence of water, either dissolved or dispersed throughout the mass of the fuel or accumulated at the bottom of the receptacle containing the fuel.

In order to increase the efficiency of the organic stabilizing agent, it is feasible to add an inorganic acid, such as boric acid, to the treated gasoline. If it were estimated, for instance, that the amount of water present at the bottom of the receptacle containing the gasoline were 10 lbs., sufficient dry boric acid could be added through the top of the tank to form a saturated boric acid solution with that amount of water. About 0.5 lb. of boric acid might thus be added, but as little as 0.1 lb. would be immediately sufficient to furnish a hydrogen ion concentration that would inhibit the formation of an insoluble basic salt or base of the heavy metal present. In the case of boric acid, a hydrogen ion concentration equivalent to a pH of about 5.6 is produced.

In place of boric acid, as the water soluble acid reacting substance, various other acids or acid reacting substances soluble in water may be used, such as acid metal salts like sodium bisulphate; inorganic acids, such as phosphoric acid; organic acids, such as citric, acetic, salicylic, propionic, hydroxy propionic, lactic, saccharic, formic, malic, malonic, maleic, tartaric, succinic; and various acidic compounds which are capable of forming water soluble salts with the heavy metals.

The heavy metals with which this invention is more particularly concerned are the following:

| | |
|---|---|
| Cobalt | Zirconium |
| Nickel | Beryllium |
| Iron | Platinum |
| Manganese | Palladium |
| Copper | Thorium |
| Lead | Chromium |
| Uranium | Aluminum |
| Molybdenum | Rare earth metals such as cerium, etc. |
| Vanadium | |

While this invention has been particularly described in connection with heavy metal salts of the beta diketones, such as acetyl acetone, propionyl acetone, and the like, in general the organic part of the compound requiring stabilization may be any organic acid or compound reacting as an acid combined with the metal, such for example as the following organic acids or acid reacting organic compounds:

Naphthenic and paraffinic acids
Mono alkyl esters of salicylic, phthalic, camphoric, malonic and other dicarboxylic organic acids
Cresylic acid and other phenols
Mercaptans
Aceto acetic acid esters and their homologues
Long chain saturated and unsaturated fatty acids
Aryl carboxylic acids The term, "beta diketone", as used by itself herein signifies the free organic beta diketone.

I am aware that numerous details of the process may be varied through a wide range without departing from the principles of this invention, and I, therefore, do not purpose limiting the patent granted hereon otherwise than necessitated by the prior art.

I claim as my invention:

1. The method of stabilizing a solution of a heavy metal beta-diketonate compound in a liquid hydrocarbon, associated with water, where the metal-organic compound has a tendency to form an insoluble precipitate in the presence of water, which comprises adding thereto an oil soluble organic acid capable of reacting with the metal present to form an oil or water soluble compound that inhibits such tendency.

2. The method of stabilizing a liquid hydrocarbon motor fuel containing a dissolved heavy metal beta-diketonate, which comprises dissolving an organic diketone in said fuel.

3. The method of stabilizing a liquid hydrocarbon motor fuel containing a dissolved heavy metal beta-diketonates when said fuel is in contact with a water phase, which comprises dissolving a naphthenic acid in said fuel.

4. The method of stabilizing a liquid hydrocarbon motor fuel containing a dissolved heavy metal beta-diketonate when said fuel is in contact with a water phase, which comprises dissolving ethyl aceto-acetate in said fuel.

5. The method of stabilizing a liquid hydrocarbon motor fuel containing a dissolved heavy metal beta-diketonate which comprises dissolving in said fuel an amount of an organic diketone equal to about 10% and over of the weight of said heavy metal beta-diketonate.

6. The method of stabilizing a liquid hydrocarbon motor fuel containing a dissolved heavy metal beta-diketonate when said fuel is in contact with a water phase which comprises dissolving in said fuel an amount of a naphthenic acid equal to about 10% and over of the weight of said heavy metal beta-diketonate.

7. The method of stabilizing a liquid hydrocarbon motor fuel containing a dissolved heavy metal beta-diketonate which comprises dissolving in said fuel an amount of ethyl acetoacetate equal to about 10% and over of the weight of said heavy metal beta-diketonate.

8. A relatively stable treated motor fuel system comprising gasoline, water in contact therewith, a heavy metal beta-diketonate and 10% and over by weight of said heavy metal beta-diketonate of an oil soluble organic acid that inhibits the tendency of said heavy metal to form an insoluble precipitate in the presence of said water.

9. A relatively stable treated motor fuel system comprising gasoline, water in contact therewith, a heavy metal beta-diketonate and 10% and over by weight of said heavy metal beta-diketonate of a naphthenic acid.

10. The method of stabilizing a solution of a heavy metal derivative of a beta-diketone in a hydrocarbon motor fuel of the gasoline type that is in physical contact with water to prevent the formation of insoluble compounds of said heavy metal due to the presence of water, which method comprises dissolving in said fuel solution a relatively lesser amount of a fuel-soluble organic acid reacting compound capable of forming an oil or water soluble compound of said heavy metal.

11. A stable commercial gasoline of an aromatic nature associated with moisture and having dissolved therein a heavy metal beta-diketonate and a water-insoluble non-metallic organic diketone as a stabilizer.

12. A stable commercial gasoline associated with moisture and having dissolved therein a heavy metal beta-diketonate and a water-insoluble non-metallic organic diketone as a stabilizer.

13. A stable commercial gasoline of an aromatic nature associated with moisture and having dissolved therein a heavy metal beta-diketonate and naphthenic acid as a stabilizing agent.

14. A stable commercial gasoline associated with moisture and having dissolved therein a heavy metal beta-diketonate and naphthenic acid as a stabilizing agent.

WALTER S. GUTHMANN.